United States Patent [11] 3,548,114

[72] Inventors Leonard A. Fish
21 W. Goetle St., Chicago 60610,
Raymond G. Stanner, 5616 S. Mozart St.,
Chicago 60629, and Richard G. Kerwin,
1004 Elmhurst Road, Prospect Heights, Ill.
60070

[21] Appl. No. 599,085
[22] Filed Dec. 5, 1966
[45] Patented Dec. 15, 1970

[54] MAGNETIC TAPE DECK WITH SELECTIVELY MOVABLE TRANSDUCING HEAD
1 Claim, 8 Drawing Figs.

[52] U.S. Cl. .......... 179/100.2
[51] Int. Cl. .......... G11b 21/08, G11b 23/04, G11b 23/18
[50] Field of Search .......... 179/100.2(Z), (CA), (MI); 274/4(A)

[56] References Cited
UNITED STATES PATENTS

| | | | |
|---|---|---|---|
| 2,670,212 | 2/1954 | Heller | 179/100.2X |
| 3,370,131 | 2/1968 | Reed | 179/100.2 |
| 3,381,965 | 5/1968 | Browder | 179/100.2 |
| 3,388,911 | 6/1968 | Wilson et al. | 179/100.2 |
| 2,213,631 | 9/1940 | Heller et al. | 179/100.2 |

*Primary Examiner*—Bernard Konick
*Assistant Examiner*—Robert S. Tupper
*Attorney*—Pendleton, Neuman, Williams & Anderson

ABSTRACT: This disclosure relates to a magnetic tape deck adapted for playing either four-track or eight-track cartridges of magnetic tape. A track is selected by a plurality of cams mounted on a member which is selectively rotated by a motor, under control of a switch connected for rotation with the rotatable member. A mechanism is provided for distinguishing between four-track and eight-track cartridges, to permit positioning of the transducing head accordingly. The cartridge is movable away from the head, to disengage the drive capstan, when the device is not in use.

INVENTORS
LEONARD A. FISH
RAYMOND G. STANNER
RICHARD G. KERWIN
BY PENDLETON, NEUMAN
SEIBOLD & WILLIAMS
ATTORNEYS

INVENTORS
LEONARD A. FISH
REYMOND G. STANNER
RICHARD G. KERWIN
BY PENDLETON, NEUMAN
SEIBOLD & WILLIAMS
ATTORNEYS

INVENTORS
LEONARD A. FISH
RAYMOND G. STANNER
RICHARD G. KERWIN
BY PENDLETON, NEUMAN
SEIBOLD & WILLIAMS
ATTORNEYS

MAGNETIC TAPE DECK WITH SELECTIVELY MOVABLE TRANSDUCING HEAD

This application relates to magnetic tape reproducers and/or recorders, and in particular to the tape decks of such machines, adapted to support magnetic tape, and arrange for transport of the tape past a transducing head.

The mechanism of the present invention is particularly adapted for use in automobiles, but may alternatively be employed in home-entertainment systems. It is adapted to accept a cartridge containing a continuous ribbon of magnetic tape which may conveniently be manipulated. Tape decks, and specifically automotive tape decks, have been known in the prior art, but all of the previous attempts to render tape reproducing machines adaptable for use in automobiles have encountered several serious disadvantages.

One of the most troublesome problems in prior art cartridge tape decks involves the adjustable positioning of the magnetic transducing head relative to the various magnetic tracks on the tape. Such adjustability is necessary in order to provide a choice of program material, but the known mechanisms for accomplishing this have been very susceptible to sharp bumps and jerks when, for example, the automobile is traveling at high speed or over a relatively rough road. Such bumps and jerks have caused the transducing heads of known tape decks to momentarily shift channels or at least to interfere with the quality of the reproduction.

The apparatus of the present invention has overcome this difficulty by employing a motor with a gear train for controlling a movable mechanism to cam the transducing head supporting means against a relatively stiff spring into one of a plurality of positions corresponding to the various magnetic channels recorded on the tape. By this means, it has been possible to make the transducing head practically completely insensitive to bumps and jerks encountered in the automobile.

Known devices have also been limited in their ability to play only one of the two commonly available types of continuous tape cartridges. Cartridges are available in which either four or eight magnetic tracks are provided on the tape. The four-track tape is used to carry two stereo programs and the eight-track tape carries four stereo programs. The width and spacing of the magnetic tracks on the four- and eight-track tapes are different, so that many of the prior art apparatus for playing four-track cartridges is ordinarily not suitable for playing eight-track cartridges, and vice versa.

In the present invention, apparatus is provided for adjusting the position of the magnetic transducing head in accordance with either type of cartridge. One of four specific positions is used for the magnetic transducing head when an eight-track cartridge is being used, and two additional positions are used when a four-track cartridge is being used. The apparatus of the present invention employs means to sense whether a cartridge has either four- or eight-tracks, so as to automatically choose the proper positions of the transducing head for the cartridge.

Another problem which has plagued prior art mechanisms for playing tape cartridges has been the vulnerability of the pinch roller by which the tape is advanced. When the tape within a cartridge is being played, the pinch roller presses the tape against the surface of a capstan, so that the rotation of the capstan causes advancement of the tape. When the tape deck is not being used, if the pinch roller maintains contact with the capstan with the same pressure used in advancing the tape, the pinch roller soon becomes flattened on one side or otherwise deformed, and no longer operates properly to advance the tape at a uniform speed. In addition, when the ambient temperature of the automobile is at a high level, the tape within a cartridge has a tendency to stick to the capstan or to the pinch roller if maintained stationary therebetween, with the result that resumption of playing of the cartridge frequently results in breaking the tape.

In the present invention, a mechanism is provided to automatically disengage the pinch roller from the capstan when a tape is not being played, so that the pinch roller and the capstan may not remain in contact unless the tape is being advanced.

Known tape decks have also suffered by their inability to switch between tape channels in either direction, but instead have permitted switching in only a single sequence. In the present invention, a mechanism is provided to permit sequential selection in either direction, either manually or automatically. In addition, the mechanism of the present invention is adapted to visually indicate the track which is being played at any time.

Yet a further disadvantage of known systems results from the use of DC motors for the capstan drive. Such motors are inherently complicated and unreliable in that they employ brushes, which generate electrical noise and which must frequently be replaced. In addition, DC motors require relatively complicated mechanical devices to smooth out variations in the speed of the motor, such as a heavy flywheel connected to the motor by a soft rubber belt. This produces distinct and objectionable variation in the tape transport speed. In the present invention, a comparatively inexpensive shaded pole induction motor is employed for the capstan drive. Such motor does not employ brushes, and therefore maintenance is much simpler than with DC motors. There is also relatively less wow and flutter produced by such a motor. In the present invention, the armature of the motor is connected directly to the capstan and the diameter of the capstan is made relatively small so that the motor is rotated at a relatively high angular velocity. The armature of the motor is, in effect, a flywheel which tends to average out any variations in the angular velocity of the capstan. As the flywheel effect is proportional to the square of the speed of rotation, making the capstan small in diameter brings about a relatively great increase in constancy of the angular velocity of the capstan and the corresponding velocity of advance of the magnetic tape.

These and other objects and advantages of the present invention will become manifest upon an examination of the following description and the accompanying drawings in which.

In one embodiment of the present invention, there is provided means for receiving and supporting a magnetic tape cartridge having an endless ribbon of magnetic tape mounted therein, a magnetic tape reading head supported in juxtaposition with the tape of said cartridge, means for selectively adjusting the position of said magnetic transducing head relative to said magnetic tape for selecting one of a plurality of channels of information of said tape, selectively operable means for changing the position of said magnetic head relative to said tape, means for identifying a four-track or an eight-track cartridge within the cartridge supporting means, circuit means responsive to said identifying means and to said selectively operable means for selectively either automatically or manually selecting one of a plurality of channels of information of said tape in a variety of sequences, drive means for driving a capstan in association with said magnetic tape for causing said tape to be transported past said transducing head, and means for selectively disengaging said capstan from said tape, said last named means being automatically operative when said drive means is interrupted.

Figures 1, 2, 5:
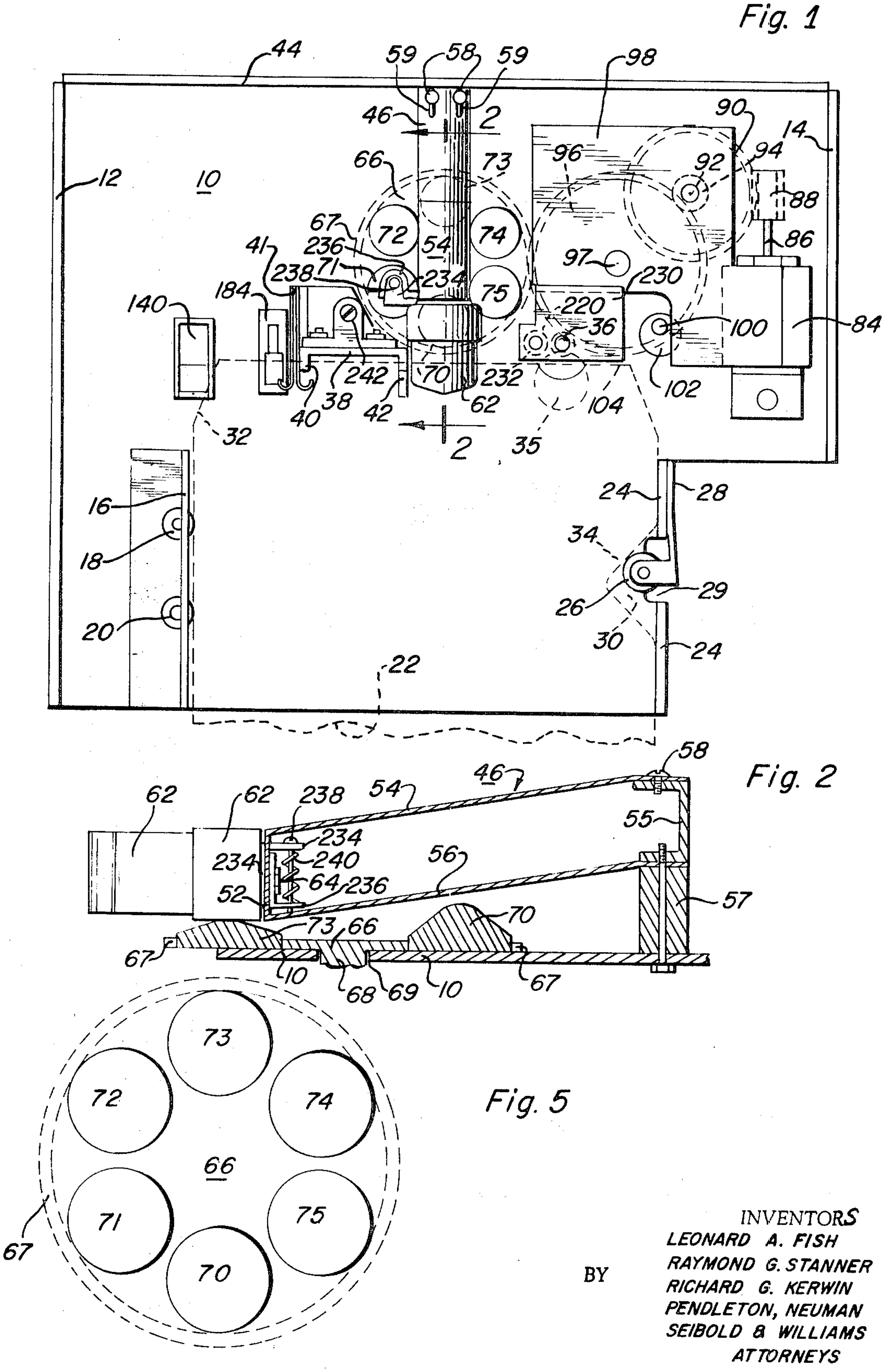
FIG. 1 is a plan view, partly in cross section, of apparatus embodying an illustrative embodiment of the present invention.
FIG. 2 is a side elevation of a portion of the apparatus illustrated in FIG. 1.
FIG. 5 is a plan view of a portion of the apparatus illustrated in FIG. 1.

Referring now to FIG. 1, in which there is illustrated a plan view of apparatus incorporating an illustrative embodiment of the present invention, a cartridge supporting assembly having a bottom wall 10 and sidewalls 12 and 14 is illustrated. An angle member 16 is secured to the bottom wall 10 adjacent the front of the supporting assembly, and on the angle member 16 a pair of wheels 18 and 20 are rotatably mounted. The wheels 18 and 20 are adapted to engage one side of a cartridge 22 upon insertion of the same within the cartridge supporting assembly. At the side opposite the angle 16, the bottom wall 10 is upturned to form a vertical projection or flange 24, such that the vertical leg of the angle 16 and the flange 24 form a channel into which the cartridge 22 may be inserted. A roller 26 is mounted by means of a spring 28 to the outside surface of the flange 24 and projects through an aperture 29 in the flange 24 to engage a notch 30 in the side of the cartridge 22.

The cartridge 22, illustrated (in dashed lines) in position within the cartridge supporting assembly, is an eight-track cartridge and can be identified as such in either of two ways. The notch 30 is present only in an eight-track cartridge, and one of the corners 32 of the cartridge 22 is cut off or beveled, as illustrated. A four-track cartridge has a square, rather than beveled, corner 32.

The location of the roller 26 and its mounting spring 28 is such that the roller 26 bears against the reverse side 34 of the notch 30, so that the spring pressure tends to force the cartridge 22 rearwardly, and leftwardly, aligning the same against the two rollers 18 and 20 on the left side, and with the pinch roller 35 against the capstan 36 at the rear.

Also mounted on the bottom wall 10 is a tape guide member 38 which has a pair of arms 40 and 42 adapted to protrude into the cartridge 22. The arm 42 helps to guide the tape within the cartridge, and the arm 40 supports a pair of electrodes 41, which form a switch for a purpose to be described hereinafter.

A leaf spring 46 is provided, which is formed of a single strip of resilient material, bent or otherwise conformed to a figure having three sides, as illustrated in FIG. 2. The upper and lower sides 54 and 56 (as viewed in FIG. 2) are parallel, and the side 52 is normal to the bottom wall 10. The rear end of the lower side 56 is clamped between a bracket 55 and a spacer 57 which is secured to the bottom wall 10. A pair of screws 58, passing through slots 59 in the upper wall 54, adjustably secure the spring 46 to the bracket 55. A magnetic transducing head 62 is secured to the left-hand wall 52 of the spring 46 by means of one or more screws 64, and the leaf spring 46 can flex to permit the head 62 to move in an up and down direction, parallel to the surface of the rear wall 44.

A gear 66, with teeth 67, having a central shaft 68, is mounted in an aperture 69 of the bottom wall 10. The gear 66 has a plurality of apertures into which are placed inserts 70 through 75 (FIG. 5) each of which has a cam-shaped upper surface (FIG. 2). The gear 66 is adapted to be rotated to bring one or more of the inserts 70 through 75 directly under the magnetic transducing head 62. The elevation of each of the inserts 70 through 75 is such to raise the head 62 a predetermined different amount, so that the head is adjacent the proper two tracks of the tape.

Figure 4:
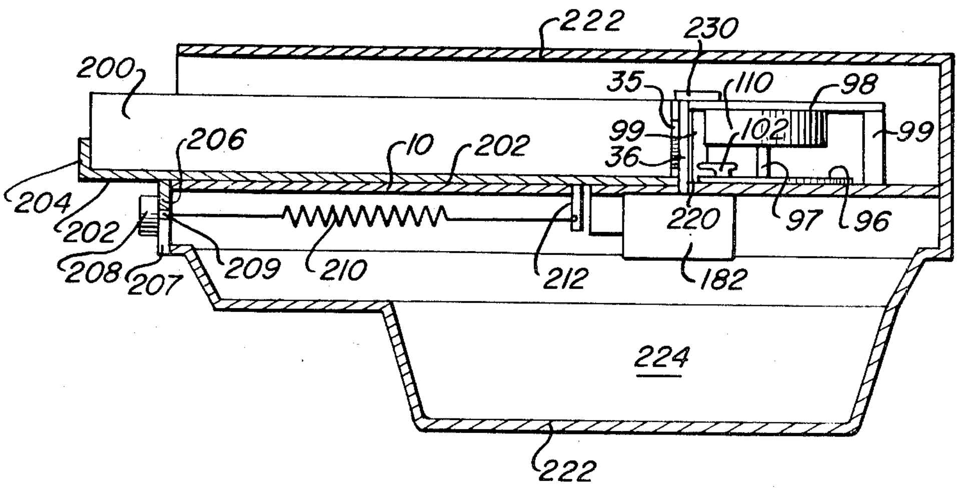
FIG. 4 is a side elevational view, partly in section, of the apparatus illustrated in FIGS. 1 and 2.

Referring again to FIG. 1, the means by which the gear 66 is rotated is illustrated. A small DC motor 84 mounted on the bottom wall 10, is provided with a shaft 86 on which is secured a worm gear 88. The worm gear 88 is in engagement with a gear 90 which is connected to a shaft 92 bearing a smaller gear 94. The smaller gear 94 is in engagement with a gear 96, which, in turn, is in engagement with the gear 66, the gear 96 is mounted on a shaft 97 the lower end of which is journaled in the bottom wall 10, and the upper end of which is journaled in a plate 98, secured to the bottom wall 10 by brackets 99 (FIG. 4). There is thus formed a gear train in which the speed of the motor 84 is vastly reduced so that the gears 96 and 66 turn considerably slower than the shaft 86.

Secured to the top of the gear 96 by a pin 100, is a button 102 which extends outwardly from the periphery of the gear 96. It does not interfere with the gear 96 or the gear 94 because it is raised above the level of those gears. The shaft 92, on which the gear 94 is mounted, terminates at the gear 94 so that the button 102 does not interfere with it either.

The gears 66 and 96 each have the same number of teeth so that each makes one complete revolution during the same interval. The button 102 is adapted to project beyond the periphery of the gear 96 to engage a corner 104 of the cartridge when the button 102 is in its lowermost position on the gear 96, as viewed in FIG. 1. This position corresponds to a position in which the magnetic transducing head 62 is midway between the insert 70 and 71 of the gear 66. In this condition the cartridge 32 is pushed slightly outwardly, relative to the supporting assembly, and the wheel 26 rides part way up the inclined surface 34 of the notch 30. By this means, the pinch roller 35, mounted within the cartridge 22 is pushed away from the capstan 36, so that there is no pressure between the capstan 36 and the pinch roller 35 at this time. When the gear 96 is stopped in the position in which the button 102 is in the lowermost operative position, as viewed in FIG. 1, the pinch roller 35 remains out of contact with the capstan 36. As will be described in more detail hereinafter, in the normal unactuated condition of the tape deck, the button 102 is in its operative (lower) condition, thereby preventing the capstan 36 from depressing or otherwise deforming the pinch roller 35.

Figure 3:
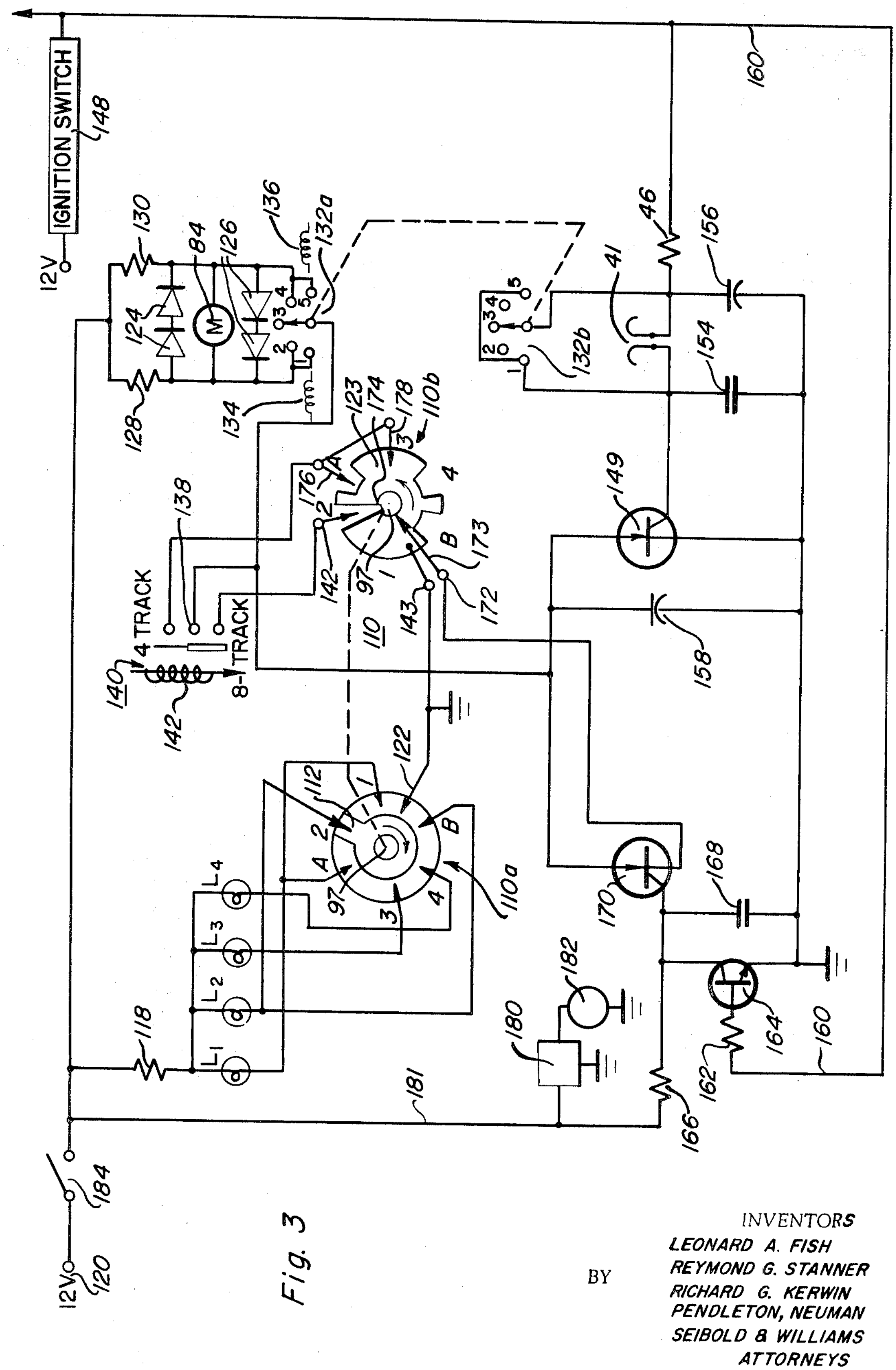
FIG. 3 is a schematic diagram of certain circuitry associated with the apparatus illustrated in FIGS. 1 and 2.

Referring now to FIG. 3, there is illustrated a schematic diagram of a circuit associated with the apparatus illustrated in FIGS. 1 and 2. A rotary switch assembly 110 (see also FIG. 4) is mounted on the plate 98, and its control shaft is the shaft 97. Accordingly, as the gear 96 turns, the operating shaft 97 of the switch 110 also turns, and the switch 110 is caused, by rotation of the shaft 97, to traverse its various conditions.

The switch 110 has two wafers or sections, one of which (110*a*) is designed to operate the indicator lamps $L_1$, $L_2$, $L_3$, and $L_4$, to indicate which channels are being played on the tape. The second section 110*b* of the switch 110 is designed to control the operation of the motor 84 for operation in various modes depending on various conditions.

The section 110*a* of the switch 110 is a single-pole, six-throw switch. It is actuated by the shaft 97 upon which a rotating contact 112 is mounted. The six positions of the switch 110*a* are each 60° apart, and the switch is illustrated in position number 2. The six positions are identified as positions 1, 2, A, 3, 4, and B in that order, proceeding counterclockwise. The lamps $L_1$, $L_2$, $L_3$ and $L_4$ are connected to various terminals of the switch 110*a* such that one of the lamps is lit for any position of the switch. A resistor 118 connects one terminal of each of the four lamps to a source 120 of positive potential, which is preferably the positive terminal of a 12 volt automotive battery. The other terminals of the four lamps $L_1$, $L_2$, $L_3$ and $L_4$ are connected to the terminals of the switch bearing the corresponding numbers. In addition, $L_1$ is also connected to the A terminal of the switch 110*a* and $L_2$ is also connected to the B terminal of the switch 110*a*. The four lamps identify which of the four stereo channels of an eight-track tape is being played at any given moment. The two lamps $L_1$ and $L_2$, when the switch 110*a* is in its A or B position, respectively, indicate which of the two stereo channels of a four-track tape is being played at any given moment. The rotating contact 112 is connected to ground by means of a slider 122 so that in any given position, one of the terminals of the switch 110*a* is connected to ground through the switch.

The section 110*b* has a relatively complex rotating contact 123 which is provided with several notches in its periphery, in order to open a circuit between a source of voltage and the motor 84 under certain circumstances. The motor 84 is preferably a 3 volt DC motor, and is connected in circuit with a pair of diodes 124 and a pair of oppositely poled diodes 126 connected in series with each other and in parallel with the motor 84. One terminal of the motor 84 is connected through a resistor 128 to the source 120, and the opposite terminal of the motor 84 is connected through a similar resistor 130 to the same source 120. The two terminals of the motor 84 are connected to four of five terminals of one pole 132*a* of a double-pole, five-throw switch 132, illustrated in FIG. 2 in its central number 3 position. The switch 132 is provided with springs 134 and 136 which bias it toward one of its central positions, namely, positions numbers 2, 3 and 4. When the switch is in position 1 or in position 5, the springs 134 and 136, respectively, bias it back, and it may be maintained in either position 1 or 5 only by continuing manual pressure.

When the switch 132 is in its central, or its number 3 position, as illustrated, the circuit to the motor 84 is open, so that there can be no rotation of the shaft 97. In this condition the same track of the cartridge is played over and over.

When the switch 132 is moved away from its central position, however, a circuit to the motor 84 may be completed. Assuming for example, that the switch is in position number 2, current flows from the source 120 through the resistor 128 to terminal 2, and also through a path in parallel with the resistor 28, through the resistor 130 and the diodes 126. The forward voltage drop across the diodes 126 is about 3 volts, which is sufficient to operate the motor 84 in one direction. The rotating contact of the pole **132*a* is connected to the central contact 138 of a slide switch 140. The switch 140 is biased toward the eight-track position, as illustrated, by a spring 142. Thus, the switch is normally in the position indicated in FIG. 2. A circuit from the rotating contact of the switch 132*a* is thereby completed, through the switch 140, to a terminal 142 of the switch section 110*b*. In the position illustrated in FIG. 2, the fixed contact or wiper connected to the terminal 142 is open circuited, and so the motor 84 may not be engaged. This position of the rotary contact 123 corresponds to the gear 66 being in a position in which one of the inserts 70 through 75 is directly under the magnetic transducing head 62**, so that the head is in a proper reproducing position.

The contacts 41 are connected, by way of a resistor 146 to the key or ignition switch indicated diagrammatically as 148. The switch 148 is a switch by which the ignition in the automobile is turned on and off. A positive potential is applied to the resistor 146 only when the ignition of the automobile is turned on.

When the tape deck is operating, and a tape is being played, the switch 41 is closed when a conductive strip on the tape, identifying the end of a cycle of the tape within the cartridge, comes into contact with the contacts of the switch 41, and the switch 41 then completes a circuit to the control terminals of an SCR 149. The anode of the SCR 149 is connected to the central pole of the switch 132 and the cathode of the SCR 149 is connected to ground. Accordingly, a circuit is completed through the motor 84, when the switch 41 is closed, through the SCR 149. This causes the motor 84 to rotate in one direction or the other, depending on the position of the switch 132, to bring the rotary contact 123 of the switch **110*b* into contact with the contact connected to the terminal 142. There is thereby completed a circuit through the motor 84 and through the terminal 142 to the rotary contact 123. The rotary contact 123 is always connected to ground through the terminal 143. This circuit is complete as long as there is a common path through the rotary contact 123. With the switch 132 on position number 2, for example, the shaft 97 rotates in the direction indicated by the arrows on the switch 110, and the circuit between the terminal 142 and the contact 123 remains complete until the notch illustrated in position A reaches the contact connected to the terminal 142 in FIG. 2. When the rotary contact 123 reaches this position, the circuit is broken, and the motor 84 is deenergized. The SCR 149 does not remain conducting for the entire time during which the motor 84 is rotating the shaft 97, because the capacitor 154, which is connected across the control terminals of the SCR 149 does not hold a sufficient charge to maintain the SCR 148 in its conductive state after the switch 41 has opened. During the period that the switch 41 is closed, however, a capacitor 156 which has a much larger capacitance, does maintain the SCR 148 in its conductive state long enough to insure moving the rotary contact 123** to its next operative position.

The pole **132*b* of the switch 132 has its extreme right- and left-hand positions, numbers 1 and 5, connected together, and to one side of the switch 41. The rotary contact of the switch 132*b* is connected to the other side of the switch 41. By this means, the switch 41 is shorted whenever the switch 132*b* is rotated to either its extreme right- or left-hand position. This initiates rotation of the motor 84 manually, in the same manner as described above for automatic operation. The direction in which the switch 132 is rotated determines the direction of rotation of the motor 84**.

A capacitor 158 is connected across the anode and cathode of the SCR 149, in order to smooth any ripple that may be present in the applied voltage.

The circuitry illustrated in FIG. 2 also rotates the motor 84 whenever the key switch 148 is turned off, to disable the ignition of the automobile. When this occurs, a circuit over line 160, leading from the key switch 148 through a resistor 162 to the base of a transistor 164, is open circuited, thereby cutting off the transistor 164 which is normally conducting. The conductive path through the transistor 164 is from the source 120 through a resistor 166, and thence through the collector and emitter of the transistor 164 to ground. A capacitor 168 is connected across the collector and emitter of the transistor 164, and is normally thereby prevented from being charged by the source 120. When the transistor 124 is cut off, however, by opening the key switch 148, the capacitor 168 is charged through the resistor 166, and rapidly assumes a high positive potential. One terminal of the capacitor 168 is connected to the control terminal of an SCR 170, and when the capacitor 168 assumes a predetermined positive potential, the SCR 170 is fired which completes the circuit from the central motor circuit through the switch **132*a* and the SCR 170 to a terminal 172 of the switch 110*b*, which is connected to a wiper 173 which engages the shaft 97. The motor 84 is thereby energized and continues to rotate the shaft 97, until the wiper 173 comes into engagement with a notch 174 within the shaft 97. When this occurs the circuit completed through the wiper 173, and the SCR 170 is opened, and the motor 84 is deenergized. This position of the switch 132 (and the shaft 97) corresponds to the location of the button 102 adjacent the cartridge 22 which serves thereby to push the cartridge away from the capstan 36. Whenever the key switch is reenergized, the motor 84 is immediately energized through the innerconnection of the terminal 142 and the rotating contact 123**, until the latter has rotated to the next operative position.

Referring again to FIG. 1, the switch 140 is mounted on the bottom wall 10 with its slide actuator projecting upwardly therefrom. When an eight-track cartridge is in position, as shown, the switch 140 is in the condition illustrated in FIG. 3. When a four-track cartridge is inserted, however, the actuator of the switch 140 is moved upwardly as viewed in FIG. 1, by virtue of the square corner of the four-track cartridge. When this occurs, the switch 140 assumes its upper position, as viewed in FIG. 3, and its central contact 138 is connected to its upper contact. The upper contact of the switch 140 is connected to a pair of wipers 176 and 178, respectively, located at the positions identified as positions A and 3 in FIG. 3. When a four-track cartridge is inserted, the motor 84 rotates until the rotating contact 123 is in either one of two positions. These two positions are defined by both of the wipers 176 and 178 being opposite a notch in the rotating contact 123. It is evident that this can occur only when the contact 123 is rotated clockwise 60° from the position illustrated in FIG. 2 or counterclockwise 120°. These two positions correspond to the positions of the gear 66, in which the proper inserts 70 through 75 are in position under the magnetic transducing head 62 to bring the head 62 into association with the proper tracks of the four-track cartridge tape.

An inverter 180 is connected to a line 181 leading to the source 120, and the split-phase capstan motor 182 is connected thereto. The inverter 180 converts the DC potential of the source 120 to an AC signal, for the split-phase motor 182.

A switch 184 is connected in series with the source 120, to connect the source 120 to the various motor circuits of the tape deck, whenever it is closed. The switch 184 is mounted on the bottom wall 10 (FIG. 1) just beneath the cartridge 22, so that it is closed whenever a cartridge 22 is inserted within the cartridge supporting assembly, the end wall of the cartridge 22 engaging the actuator of the switch 184.

Figures 6, 8:
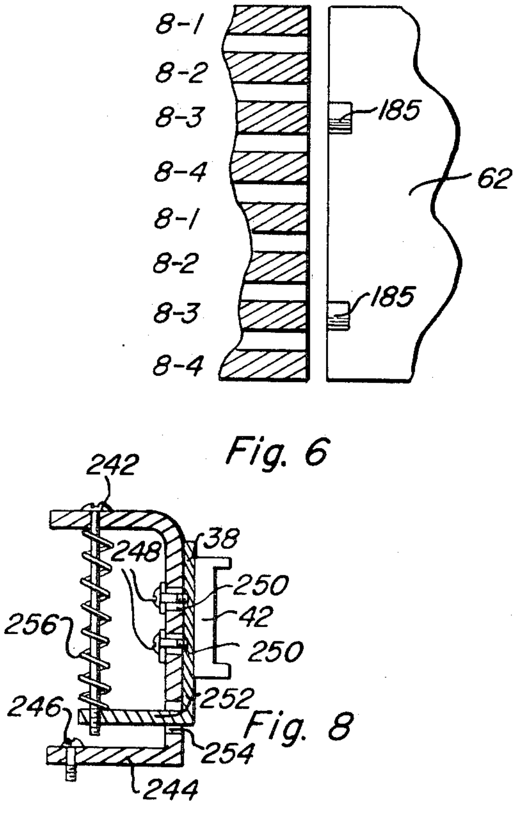
FIG. 6 is a diagrammatic, fragmentary view of a transducing head in association with an eight-track tape.
FIG. 8 is a cross-sectional view of a portion of the apparatus illustrated in FIG. 1.
Figure 7:
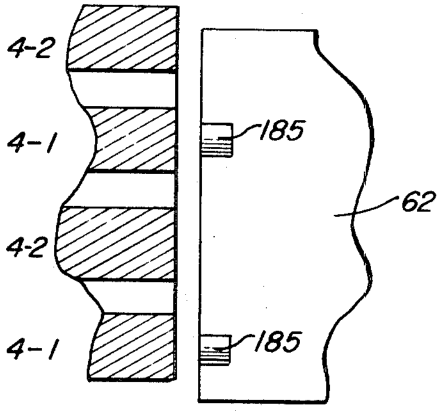
FIG. 7 is a diagrammatic, fragmentary view of a transducing head in association with a four-track tape.

Referring now to FIGS. 6 and 7, the relationship between the various tracks in the magnetic tapes within the cartridges is illustrated in association with the two pickup means of the magnetic transducing head 62. In FIG. 6, the two pickup means 185 of the magnetic head 62 are adjacent the third stereo track of the eight-track tape. If the magnetic head were to be moved down one-track width, it would be adjacent the fourth stereo track, and if the head were to be moved up one or two positions respectively, it would be opposite the second or first stereo tracks of the eight-track tape, respectively. In FIG. 7, the relationship between the head 62 and the four-track tape is illustrated. The pickup means 185 of the magnetic head 62 are illustrated adjacent the second stereo channel of the tape. If the head 62 were to be raised one track, it would then be opposite the first stereo channel of the four-track tape. It is evident from the FIGS. that the separation of the two pickup means 185 of the magnetic head 66 is the same separation as adjacent tracks of a single stereo channel of the eight-track tape. This distance is .132 inches. The separation between the central portions of corresponding tracks on a four-track tape however is .138 inches. Nevertheless, it has been found that applying the normal separation of the elements 185 (intended for an eight-track tape) to a four-track tape produces a very desirable result. It is obvious from FIGS. 6 and 7, however, that different elevations are required of the magnetic head 62 when playing the two stereo channels of the four-track tape, as opposed to any one of the four channels of the eight-track tape. These positions are automatically arrived at by positioning one of the six inserts 70 through 75 under the magnetic head 62. The plan view of the inserts is illustrated in FIG. 5. The various inserts are adapted to raise the relative position of the head 62 by the amounts indicated in the following table:

| Insert | Height | Track |
|---|---|---|
| 70 | .196 | 4-B |
| 71 | .211 | 8-1 |
| 72 | .178 | 8-2 |
| 73 | .127 | 4-A |
| 74 | .145 | 8-3 |
| 75 | .112 | 8-4 |

This arrangement of the inserts 70 through 75 has been found to be the most advantageous in view of the relative spacing from one insert to the next. In addition, the relative heights of the two inserts opposite each other at any given time on the gear 66 is such as to clear the bottom of the spring 46. The configuration as illustrated in FIG. 2 in which the insert 73 is disposed beneath head 62, is the one in which there is the greatest difference between the height of the two inserts (in this case 70 and 73) on opposite sides of the gear 66. It can be seen from FIG. 2 that the angle provided in the bottom of the spring 46 is sufficient to enable the lower sides 56 and 60 to easily clear the insert 70.

Referring now to FIG. 4, there is illustrated a side view of the entire mechanism illustrated in FIGS. 1—3. The base 10 of the cartridge supporting assembly is illustrated in cross section, and a cartridge 200 is illustrated in position on the base 10. A drawer or slide 202 separates the cartridge 200 from the bottom wall 10, and this slide 202 is adapted for use with a four-track cartridge. It is not needed when an eight-track cartridge is being played.

The motor 182 is mounted beneath the bottom wall 10 of the unit, and the capstan 36 extends upwardly through an aperture 220 in the wall 10 and is journaled in a bearing mounted on a plate 230, secured to the top of the plate 98. A spacer 232 (FIG. 1) strengthens the plate 230 so that the capstan 36 is rigidly supported at each of its ends.

One of the differences between a four-track and an eight-track cartridge is that only the eight-track cartridge is provided with the notch 30, by which the cartridge is held into position within the receiver as illustrated in FIG. 1. The four-track cartridge is not provided with such a notch and so other means must be provided for holding this cartridge in position. This means consists of the slide 202 which is provided with a front vertical flange 204, which engages the front portion of the cartridge 200. The bottom of the slide 204 has a downwardly extending flange 206 having a downwardly opening slot 207. A handle 208, having a reduced diameter portion 209, is adapted to be inserted upwardly into the slot 207, when desired, and the handle 208 is urged rearwardly by spring 210 connected at its forward end to the handle 208, and at its rearward end to a bracket 212 connected to the bottom wall 10 of the cartridge supporting apparatus. It is evident that the tray 202 need not be used with an eight-track cartridge, but can conveniently be inserted in its proper position, engaging the handle 208 with the slot 207, whenever a four-track cartridge is used. The front flange 204 urges the cartridge 200 rearwardly so that its pinch roller 35 is in engagement with the capstan 36. The motor 182 is disposed below the bottom wall 10, and powers the capstan 36, which projects upwardly through an aperture 220 in the bottom wall 10. The entire assembly is surrounded by a cabinet 222, which has a portion 224 near the bottom thereof in which the amplifiers of the system may be disposed.

Referring again to FIG. 1, there is illustrated means for adjusting the azimuth of the head 62, and the position of the tape in relation to the head. The azimuth adjusting means comprises an L-shaped bracket 234 (FIG. 2) secured to the head 62 adjacent the side 52 of the leaf spring 46, and a similar L-shaped bracket 236 secured to the leaf spring 46 under the nut 64. One leg of each of the brackets 234 and 236 overlie each other, and are interconnected with a screw 238 threadably engaged in the bracket 236. A spring 240 tends to urge the brackets apart, but tightening the screw brings the brackets closer together, against the force of the spring 240. This rotates the head 62 relative to the leaf spring 46 and also relative to the tape being played. By adjustment of the screw 238, the azimuth of the head may be set for minimum cross talk between programs on the tape.

The tape guide member 38 may also be adjusted in height, relative to the bottom wall 10, by means of a screw 242 FIGS. 1 and 8). A U-shaped bracket 244 is mounted on the bottom wall 10, by means of a screw 246, and the screw 242 is journaled in an aperture in the upper leg of the bracket 244. The guide 38 is slidably mounted on the bracket 244 by means of screws 248, which pass through elongate slots 250 in the bracket 244, to permit up and down motion of the guide 38 relative to the bracket 244. The screw 242 is threadably secured in an aperture in a horizontally extending leg 252, which passes through an aperture 254 in the bracket 244, and the elevation of the guide 38 can thus be controlled by turning the screw 242. A spring 256, disposed about the screw 242, urges the upper leg of the bracket 244 and the leg 252 apart.

While the present invention has been described with particular reference to an embodiment especially adapted for automobile use, it should be understood that the invention may equally well be employed with a system designed for home-entertainment use. In such event, the motor 84 is conveniently made on an AC motor of the type employed in electric clocks. No change need be made in the motor 84, which may be powered with AC at approximately 115 volts in either application.

In the foregoing, an illustrative embodiment of the present invention has been described in sufficient detail to enable others skilled in the art to make and use the same and, by applying current knowledge, adapt the same for use under varying conditions of service, without departing from the essential features of novelty thereof, which are intended to be defined and secured in the appended claims.

We claim:

1. A magnetic tape deck comprising a cartridge supporting assembly for supporting a cartridge containing an endless ribbon of magnetic tape having a plurality of information channels thereon spaced across the width of said ribbon, transducing head means normally juxtaposed with said tape for transducing information recorded on said information channels, adjustable supporting means connected between said head and said supporting assembly for permitting the movement of said head in a direction parallel with said tape, means for resiliently biasing said head toward said supporting assembly, movable means including a plurality of cams supported by said supporting assembly between said assembly and said head, motive means for selectively moving said movable means to locate said head relative to predetermined ones of said channels by moving predetermined cams into juxtaposition between said assembly and said head and contacting said head, said movable means comprising a rotatable member having said cams equally spaced on its periphery, said motive means comprising a motor and a speed reduction gear train whereby said movable means is rotated continuously at a substantially slower speed than said motor, rotatably actuable switch means connected to said gear train with an actuator of said switch means being rotated once for each cycle of rotation of said movable means, a plurality of contact means associated with said switch, means selectively interconnecting said motor with said contact means for selectively energizing said motor to cause said movable means to rotate until one of said cams is moved into juxtaposition with said head, switch contacts responsive to a conductive portion of said tape for initiating energization of said motor, and means for continually energizing said motor until said cam means is moved into juxtaposition with said head, said initiating means comprising an SCR in circuit with said motor, a first capacitor connected across the control terminals of said SCR, a switch and a second capacitor connected across said first capacitor, and a high impedance source of potential for charging said second capacitor to a predetermined voltage level exceeding the firing voltage of said SCR.